(No Model.)
J. R. GLEESON.
ELASTIC CUSHION FOR HUBS.
No. 484,552. Patented Oct. 18, 1892.
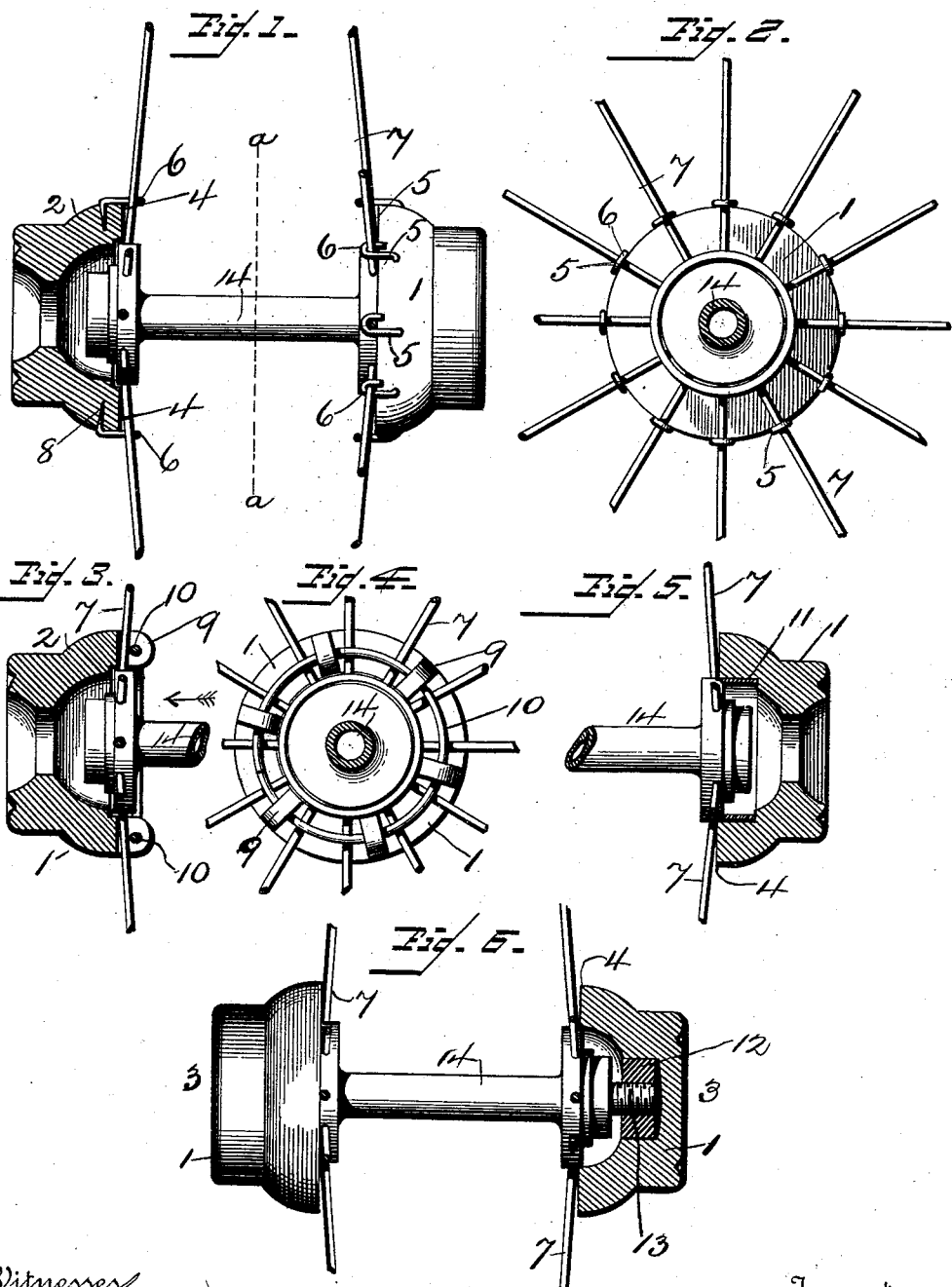

UNITED STATES PATENT OFFICE.

JOHN R. GLEESON, OF CHICO, CALIFORNIA.

ELASTIC CUSHION FOR HUBS.

SPECIFICATION forming part of Letters Patent No. 484,552, dated October 18, 1892.

Application filed February 6, 1892. Serial No. 420,537. (No model.)

*To all whom it may concern:*

Be it known that I, JOHN R. GLEESON, a citizen of the United States, residing at Chico, in the county of Butte and State of California, have invented certain new and useful Improvements in Elastic Cushions for Hubs, Shafts, &c.; and I do hereby declare the following to be a full, clear, and exact description of the invention, such as will enable others skilled in the art to which it appertains to make and use the same.

This invention relates to elastic cushions or coverings for the hubs and other projecting portions of vehicles.

The object of my invention is to produce an elastic cap or cover for the hubs, spindles, and the like of bicycles, child's carriages, wheeled chairs, and wheeled vehicles generally, whereby the interior of the hubs will be protected from dust, oil will be prevented from dropping upon the floor or carpet where the vehicle may for the time be, and the walls, doors, furniture, clothing, and other articles against which said cap may come in contact will be protected from injury by either being marred or soiled.

The construction and application of my improvements will be specifically pointed out and set forth in the following description and claims, reference being had to the accompanying drawings, in which—

Figure 1 represents a side elevation, partly in section, of a wheel having one form of my improvements applied thereto. Fig. 2 represents a section on the line *a a* of Fig. 1. Fig. 3 represents a longitudinal vertical section of a portion of a wheel, representing another method of attaching the cushion in position. Fig. 4 represents an elevation view in the direction of the arrow, Fig. 3. Fig. 5 represents a sectional elevation of a portion of a wheel with the cushion attached to a flange on the hub. Fig. 6 represents an elevation, partly in section, of a portion of the wheel with the cushion secured thereto by nut-and-thread connection.

The projecting hubs or spindles of bicycles, tricycles, child's carriages, wheeled chairs, and other wheeled vehicles and furniture-casters when unprotected with an elastic cap or covering or cushion are apt to mar the furniture, walls, doors, gates, and other objects with which such projecting portions come in contact while moving the vehicles or articles of furniture from place to place within a dwelling or while taking such articles into or removing them from a dwelling; also, when such projecting portions are exposed the lubricating material employed thereon is apt to drop down upon the carpet or floor and to soil the dress of persons coming in contact therewith. It is the object of my invention to avoid these objections, which I accomplish by applying to the projecting hubs or spindles of the wheels of vehicles and furniture-casters an elastic cap or cushion, which will permit of the vehicle or other article being rested against walls and the like or abutting against other articles without marring or soiling the same.

There are several methods by which the cap or cushion may be attached in position to preserve the hubs or spindles from contact with other articles, and I have in the drawings shown several of the methods I employ. The cushion may be either in the form of a ring with a bore therethrough or it may be in the form of a cap with a closed outer end, and it may be attached to either the spokes of a wheel or to a ring adjacent thereto or directly to the hub or by thread and nut to the journal of the spindle.

The cushion 1 is constructed of india-rubber or other suitable elastic material, so that upon coming in contact with any other article said cushion will give and prevent such article being marred or injured by such contact. This cushion may either be of ring form, as shown at 2, or it may partake of the form of a cap with closed outer end, as shown at 3. In this latter form 3 the spindle or journal will be inclosed, whereby the possibility of lubricant dropping from the spindle or journal and the coming in contact therewith of a person's clothing will be entirely prevented, and, moreover, the entrance within said hub and to the spindle of dust and dirt will also be thereby prevented.

The cap or cushion at its inner bell-shaped end is provided with an interior chamber $1^a$ to receive the hub or spindle, said cushion having a central bore, as shown, and having therein a circumferential flange or shoulder $2^a$, which will serve as a guard against the entrance of dust and other foreign matters.

It will be observed that the cushion snugly embraces the hub (see Figs. 1, 3, and 5) and that its walls are of a thickness sufficient to withstand severe impact without movement. By thus constructing the cushion of rubber and with thick walls its fending quality will remain perfect however sudden its impact with other objects, and it will not at any time give way so as to leave a mark on any object against which it comes in contact.

In the mode of application represented in Figs. 1 and 2 of the drawings the cushion 1 has an unbroken and regular inner edge 4 and is held in hub-enveloping position by a series of hooks 5, having curved or eyed ends 6, which, as clearly shown in said figures, hook over the spokes 7, and right-angled pointed ends 8, which are engaged with the elastic cushion by being forced therein. In this form it will be apparent that the means of attachment of the cushion is a very simple one and one that can readily be placed in or removed from position, and the cushion can be expeditiously applied and removed, as occasion may require. Figs. 3 and 4 represent a similar form of cushion, with the exception that the inner edge 4 thereof is provided with a circumferential series of eyed lugs 9, which extend through between the spokes 7. Through these eyed lugs is passed a ring, which rests against the inner faces of said spokes, and thereby holds the cushion securely in position by preventing the eyed lugs 9 slipping out from between the spokes.

In Fig. 5 is represented a method by which the cushion may be permanently attached to the hub. In this form 11 is a flange extending outwardly from the hub and in the same plane. The cap or cushion is in this form slipped over said flange and may be secured thereto by cement or other known and suitable means. Though I have shown the flange 11 as extending in the same plane as the hub, it is manifest that the flange may extend at right angles therefrom and the cushion slipped thereover.

Fig. 6 represents the cushion as having a closed end, though either of the cushions may be similarly constructed with closed ends, if desired, depending upon the individual taste or desire of the manufacturer or user.

In the form represented in Fig. 6 a nut 12 is embedded in the cap 3, which engages with a threaded spindle 13. 14 represents the shaft or axle.

While I have represented my device as attached to a vehicle-wheel, it is apparent that the same can with equal readiness be attached to the hubs or spindles of furniture-casters, though I have not thought it necessary to represent such application, as that will be readily apparent to any one skilled in the art.

It will be apparent that the cushion in either form shown can be very readily molded in rubber, which is the preferred material to be used in their construction, and that the entire device can be readily and cheaply constructed, applied, and removed from position.

Having thus described my invention, what I claim is—

1. A combined cushion and dust-guard for the hubs and axles of wheels, casters, and the like, consisting of a rubber cap or band having an inner bell-shaped end provided with an interior chamber to receive the hub or axle and a circumferential flange operating as a dust-guard, substantially as and for the purpose set forth.

2. A rubber cushion and shield for the hubs and axles of wheels, casters, and the like, consisting of a cap or band having an enlarged bell-shaped inner end and an inner chamber to receive said hub or axle, a straight-walled outer end, a transverse bore, and a flange or shoulder guarding said chamber, substantially as and for the purpose set forth.

3. A cushion for protecting the hubs and axles of wheels, casters, and the like and fending said hubs and axles from contact with other objects, consisting of a thick-walled rubber cap having an enlarged inner end adapted to surround said hub or axle and an inner chamber to receive and permit of the free rotation therein of said hub or axle, substantially as and for the purpose set forth.

4. A combined cushion and dust-guard for the hubs and axles of wheels, casters, and the like, consisting of a rubber cap or band having interiorly a shouldered recess to receive the projecting end of said hub or axle and guard against the entrance thereto of dust and the like and means, substantially as described, removably connecting said cushion and the spokes of the wheel, substantially as and for the purpose set forth.

5. A cushion for incasing and protecting the hubs, axles, or spindles of wheels, casters, and the like, consisting of a horizontally-walled rubber cap having a flanged and chambered interior and a connecting device connected with the horizontal circumference of said cap adjacent to the wheel and impinging against the spokes thereof, substantially as and for the purpose set forth.

6. A protective cushion for the projecting hubs of spindles of wheels, consisting of a cap of elastic or pliant soft material, as india-rubber, adapted to surround said hub or spindle and a series of hooks at one end inserted within said cushion and at the other end hooked over the wheel-spokes, substantially as and for the purpose set forth.

In testimony whereof I affix my signature in presence of two witnesses.

JOHN R. GLEESON.

Witnesses:
PARK HENSHAW,
C. C. ROYCE.